(12) United States Patent
Zhu et al.

(10) Patent No.: US 12,404,365 B2
(45) Date of Patent: Sep. 2, 2025

(54) HIGH STRENGTH ULTRA-THIN BIODEGRADABLE FILM AND PREPARATION METHOD THEREOF

(71) Applicants: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

(72) Inventors: Guixiang Zhu, Beijing (CN); Taoyi Zhang, Beijing (CN); Mingfu Lyu, Beijing (CN); Cui Zheng, Beijing (CN); Wei Zhang, Beijing (CN); Ling Han, Beijing (CN); Wenxi Ji, Beijing (CN); Ning Xu, Beijing (CN); Peng Guo, Beijing (CN)

(73) Assignees: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

( * ) Notice: Subject to any disclaimer, the term of this patent is extended or adjusted under 35 U.S.C. 154(b) by 776 days.

(21) Appl. No.: 17/753,672

(22) PCT Filed: Sep. 17, 2020

(86) PCT No.: PCT/CN2020/115783
§ 371 (c)(1),
(2) Date: Mar. 10, 2022

(87) PCT Pub. No.: WO2021/052397
PCT Pub. Date: Mar. 25, 2021

(65) Prior Publication Data
US 2022/0332888 A1    Oct. 20, 2022

(30) Foreign Application Priority Data

Sep. 17, 2019    (CN) .......................... 201910878788.9

(51) Int. Cl.
| | | |
|---|---|---|
| *C08G 63/183* | (2006.01) | |
| *C08J 5/18* | (2006.01) | |
| *C08K 13/02* | (2006.01) | |
| *C08L 67/02* | (2006.01) | |

(52) U.S. Cl.
CPC .............. *C08G 63/183* (2013.01); *C08J 5/18* (2013.01); *C08K 13/02* (2013.01); *C08L 67/02* (2013.01); *C08J 2367/02* (2013.01)

(58) Field of Classification Search
CPC .......... C08G 63/183; C08K 13/02; C08J 5/18; C08L 67/02
USPC .......................................................... 524/153
See application file for complete search history.

(56) References Cited

U.S. PATENT DOCUMENTS

| | | | |
|---|---|---|---|
| 2008/0214724 A1 | 9/2008 | Bastioli et al. | |
| 2012/0220680 A1 | 8/2012 | Bastioli et al. | |
| 2012/0329924 A1* | 12/2012 | Zhu ........................ | C08L 67/04 |
| | | | 524/230 |

FOREIGN PATENT DOCUMENTS

| | | |
|---|---|---|
| CN | 1646630 A | 7/2005 |
| CN | 102838735 A | 12/2012 |
| CN | 102838736 A | 12/2012 |
| CN | 102838855 A | 12/2012 |
| CN | 102838856 A | 12/2012 |
| CN | 103788600 A | 5/2014 |
| CN | 105109165 A | 12/2015 |
| CN | 108377821 A | 8/2018 |
| JP | 2000248163 A | 9/2000 |
| JP | 2006348168 A | 12/2006 |
| JP | 2009144021 A | 7/2009 |
| KR | 20120025864 A | 3/2012 |
| WO | 2011160053 A2 | 12/2011 |

OTHER PUBLICATIONS

Witt, U et al.; "Biodegradation of aliphatic-aromatic copolyesters: evaluation of the final biodegradability and ecotoxicological impact of degradation intermediates"; Chemosphere; vol. 44; Jul. 2001; pp. 289-299.

Lv, Jinglan et al.; "Chain Extension of Biodegradable Aliphatic/Aromatic Copolyester by Reactive Extrusion Chain Extension of Poly(Butylene Terephthalate-co-Butylene)"; Petrochemical Technology; vol. 36; No. 10; Oct. 15, 2007; ISSN: 1000-8144; pp. 1046-1051.

Pol D'Haene et al.; "Preparation and Characterization of a Branched Bacterial Polyester"; Macromolecules; vol. 32; No. 16; Jul. 22, 1999; ISSN: 1520-5835; pp. 5229-5235.

* cited by examiner

*Primary Examiner* — Deve V Hall
(74) *Attorney, Agent, or Firm* — NKL Law; Allen Xue

(57) ABSTRACT

A biodegradable film is prepared from a composition that includes a copolyester obtained by extrusion reaction of a branched aliphatic-aromatic copolyester derived from monomer a, monomer b, monomer c and monomer d with an organic peroxide. The film can be completely degraded into small molecular products such as carbon dioxide, water and the like under natural or composting conditions. Moreover, the film can be prepared having a thickness of 4-50 μm as required, and its mechanical properties can reach the same level as or even better than those of LDPE film.

47 Claims, No Drawings

HIGH STRENGTH ULTRA-THIN BIODEGRADABLE FILM AND PREPARATION METHOD THEREOF

TECHNICAL FIELD

The invention belongs to the field of biodegradable films, and particularly relates to a high strength ultra-thin biodegradable film and a preparation method thereof, and a copolyester for preparing the biodegradable film.

BACKGROUND ART

At the end of the last 70s, mulching film cover cultivation technology was introduced in China, which greatly improved the yield of crops in China, achieved remarkable economic benefits, and was praised as "white revolution" in agriculture by people. The mulching film technology has been popularized to more than 20 crops including cotton, corn, beet, sugarcane, tomato, sweet potato, melon and the like from the initial vegetable planting. However, the widespread use of mulching films also brings new problems. At present, traditional agricultural mulching film material is mainly polyethylene (PE) which is difficult to degrade under natural environmental conditions, and effective treatment measures are lacked, so that waste mulching films increase in farmland soil year by year, and pollution is continuously aggravated. According to statistics, 200~300 thousand tons of undegradable residual mulching films are newly added to farmlands in China every year, so that the soil environment is deteriorated, the water content of the soil is reduced, the soil is hardened, the fertility is reduced, and the yield of crops is reduced finally. Moreover, the mulching film fragments broken and accumulated for a long time in the soil are completely out of control, and finally permeate into the ground water system or are suspended in atmospheric dust, so that a persistent and destructive disaster is brought to people. Therefore, the development of alternative full-biodegradable mulching film materials is urgent.

The biodegradable mulching film material currently developed and used is a polyester material containing a aliphatic-aromatic copolymer as main film-forming material, with the most similar performance to the polyethylene mulching film, such as Ecoflex® developed by BASF Co., which is a poly(terephthalic acid-adipic acid-butanediol) ester (PBAT). In the literature (Chemosphere, 44(2001), 289-299), it is proved in detail that Ecoflex® can produce small molecular products: carbon dioxide and water, which are completely harmless to soil and atmosphere, after being decomposed by bacteria widely existing in soil. However, the film products of Ecoflex® and Ecovoi® (a blend of Ecoflex® and PLA), and PBAT products provided by some domestic manufacturers all have the defects of easy premature film breaking, insufficient mechanical properties, unmatched degradation cycle and the like when being actually used as mulching films, and cannot be completely pushed into the market as mulching film commodities.

Contents of the Invention

In order to solve the above problems in the prior art, an object of the invention is to provide a high strength ultra-thin biodegradable film and its preparation method. The film product has excellent mechanical properties, as well as aging performance matched with the service cycle and excellent heat preservation and water retention performance, so that it can be completely used as a biodegradable mulching film product for popularized use in different regions, and can also be used as a biodegradable packaging material.

A first aspect of the invention is to provide a biodegradable film prepared from a composition comprising: a copolyester obtained by extrusion reaction of a branched aliphatic-aromatic copolyester derived from monomer a, monomer b, monomer c and monomer d with an organic peroxide, wherein the monomer a is an aromatic dibasic acid or an ester derivative thereof; the monomer b is one or more of $C_2$-$C_{10}$ aliphatic dihydric alcohols or $C_3$-$C_{10}$ alicyclic dihydric alcohols; the monomer c is a $C_4$-$C_{20}$ aliphatic dibasic acid or an ester derivative thereof; the monomer d is one or more of polyols with a functionality of more than 2, polycarboxylic acids with a functionality of more than 2, anhydrides with a functionality of more than 2, epoxy compounds or anhydrides with hydroxyl or carboxyl group, glycidyl ester, glycidyl ether, glycidol, lactones or cyclic carbonates with hydroxyl or carboxyl side group.

A second aspect of the invention is to provide a method for preparing the biodegradable film, the method comprising the steps of:
1) preparing a copolyester by extrusion reaction of a branched aliphatic-aromatic copolyester derived from monomer a, monomer b, monomer c and monomer d with an organic peroxide;
   the monomer a is an aromatic dibasic acid or an ester derivative thereof; the monomer b is one or more of $C_2$-$C_{10}$ aliphatic dihydric alcohols or $C_3$-$C_{10}$ alicyclic dihydric alcohols; the monomer c is a $C_4$-$C_{20}$ aliphatic dibasic acid or an ester derivative thereof; the monomer d is one or more of polyols with a functionality of more than 2, polycarboxylic acids with a functionality of more than 2, anhydrides with a functionality of more than 2, epoxy compounds or anhydrides with hydroxyl or carboxyl group, glycidyl ester, glycidyl ether, glycidol, lactones or cyclic carbonates with hydroxyl or carboxyl side group;
2) extruding and granulating the copolyester obtained in the step 1) to obtain a composition; and
3) blowing the composition to obtain the biodegradable film.

A third aspect of the invention is to provide a copolyester, which is obtained by extrusion reaction of a branched aliphatic-aromatic copolyester derived from monomer a, monomer b, monomer c and monomer d with an organic peroxide, wherein the monomer a is an aromatic dibasic acid or an ester derivative thereof; the monomer b is one or more of $C_2$-$C_{10}$ aliphatic dihydric alcohols or $C_3$-$C_{10}$ alicyclic dihydric alcohols; the monomer c is a $C_4$-$C_{20}$ aliphatic dibasic acid or an ester derivative thereof; the monomer d is one or more of polyols with a functionality of more than 2, polycarboxylic acids with a functionality of more than 2, anhydrides with a functionality of more than 2, epoxy compounds or anhydrides with hydroxyl or carboxyl group, glycidyl ester, glycidyl ether, glycidol, lactones or cyclic carbonates with hydroxyl or carboxyl side group.

The film of the invention is a high-strength film product prepared by subjecting a branched, especially long branched aliphatic-aromatic copolyester as a main material to extrusion for chain extension and tackifying, to further increase the length of the branched chain, the number of the branched chain and the entanglement degree of the branched chain, and increase the melt strength while reducing the melt index, together with the use of a corresponding processing aid. The film can be completely degraded into small molecular products such as carbon dioxide, water and the like under natural or composting conditions. Moreover, the film can be prepared having with a thickness of 4-50 μm as required, and its mechanical property can reach the same level as that of the LDPE polyethylene film with the same thickness. Moreover, due to the mutual entanglement of long branches, the film also has excellent water-blocking property, and is expected to completely replace polyethylene in the fields of mulching films and packaging films.

Additional features and advantages of the invention will be set forth in the detailed description which follows.

The following is a detailed description of specific embodiments of the invention. It should be understood that the specific embodiments described herein are only to illustrate and explain, not to limit, the invention.

According to the first aspect of the invention, the invention provides a biodegradable film prepared from a composition comprising: a copolyester obtained by extrusion reaction of a branched aliphatic-aromatic copolyester derived from monomer a, monomer b, monomer c and monomer d with an organic peroxide, wherein the monomer a is an aromatic dibasic acid or an ester derivative thereof; the monomer b is one or more of $C_2$-$C_{10}$ aliphatic dihydric alcohols or $C_3$-$C_{10}$ alicyclic dihydric alcohols; the monomer c is a $C_4$-$C_{20}$ aliphatic dibasic acid or an ester derivative thereof; the monomer d is one or more of polyols with a functionality of more than 2, polycarboxylic acids with a functionality of more than 2, anhydrides with a functionality of more than 2, epoxy compounds or anhydrides with hydroxyl or carboxyl group, glycidyl ester, glycidyl ether, glycidol, lactones or cyclic carbonates with hydroxyl or carboxyl side group.

In the present invention, the branched aliphatic-aromatic copolyester is obtained by reacting monomer a, monomer b, monomer c and monomer d under the action of a catalyst system containing a second catalyst. The second catalyst is a compound of $RE(R^3)_3$, wherein RE is a rare earth metal element, $R^3$ is at least one selected from the group consisting of halogen, alkoxy group, aryloxy group, acetylacetone group and $R^4COO-$ group, wherein $R^4$ is $C_1$-$C_{30}$ alkyl group. Preferably, RE is lanthanum, cerium, praseodymium, neodymium, terbium, ytterbium, dysprosium, samarium or scandium; the halogen is chlorine or bromine, the alkoxy group is $C_3$-$C_6$ alkoxy group, the aryloxy group is aryloxy group comprising at least one benzene ring and/or naphthalene ring, and $R^4$ is $C_1$-$C_{20}$ alkyl group. Further preferably, RE is selected from lanthanum, cerium, praseodymium, neodymium or scandium, the halogen is chlorine or bromine, the alkyl group in the alkoxy group is isopropyl group, n-butyl group or isopentyl group, the aryl group in the aryloxy group is 2,6-di-tert-butyl-4-methylphenyl group or 4-butylphenyl group, and $R^4$ is $C_3$-$C_{18}$ alkyl group. More preferably, the second catalyst is one or more selected from the group consisting of lanthanum acetylacetonate, neodymium acetylacetonate, neodymium isopropoxide, lanthanum isopropoxide, scandium isopropoxide, lanthanum stearate, neodymium stearate, lanthanum chloride, tris(2,6-di-tert-butyl-4-methylphenoxy) lanthanum, and hydrates thereof.

In the present invention, the catalyst system further comprises a first catalyst and/or a third catalyst.

The first catalyst is one or more selected from the group consisting of an oxide of M, $M(OR^1)_n$ and $M(OOCR^2)_m$, wherein M is titanium, antimony or zinc, n and m are each independently the valence of M, $R^1$ is $C_1$-$C_{10}$ alkyl group, and $R^2$ is $C_1$-$C_{20}$ alkyl group. Preferably, the first catalyst is at least one selected from the group consisting of titanium alkoxide, antimony acetate, zinc acetate, zinc oxide, antimony oxide and titanium oxide. More preferably, the first catalyst is at least one selected from the group consisting of tetrabutyl titanate ($Ti(OC_4H_9)_4$), titanium isopropoxide, titanium dioxide, antimony trioxide, antimony acetate and zinc acetate.

The third catalyst is at least one organotin compound. Preferably, the third catalyst is at least one selected from the group consisting of dibutyltin oxide, methylphenyltin oxide, tetraethyltin, hexaethyltin oxide, hexacyclohexylditin oxide, didodecyltin oxide, triethylhydroxytin, triphenylhydroxytin, triisobutyltin acetate, dibutyltin diacetate, diphenyltin dilaurate, monobutyltin trichloride, tributyltin chloride, dibutyltin sulfide, butylhydroxytin oxide, methyl stannic acid, ethyl stannic acid and butyl stannic acid. Further preferably, the third catalyst is a mixture of at least two selected from the group consisting of dibutyltin oxide, tetraethyltin, triphenylhydroxytin, dibutyltin diacetate, diphenyltin dilaurate, monobutyltin trichloride, tributyltin chloride, dibutyltin sulfide, butylhydroxytin oxide, methyl stannoic acid, ethyl stannoic acid and butyl stannoic acid. In this case, the amount of each component of the third catalyst may be 10 to 90 mol %, preferably 30 to 70 mol %.

The catalyst of the invention may be used in the amount conventionally used in the art, preferably, the molar ratio of the catalyst in its entirety to the monomer (a+c) is 1:1000-20000, and the molar ratio of the first catalyst to the second catalyst to the third catalyst is 0-20:0.1-10:0-1, preferably 0.1-20:0.1-10:1.

The monomer a may be selected from terephthalic acid, dimethyl terephthalate, phthalic acid, toluene dicarboxylic acid, naphthalene dicarboxylic acid, preferably terephthalic acid or dimethyl terephthalate; the monomer b may be selected from ethylene glycol, 1,3-propanediol, 1,4-butanediol, 1,5-pentanediol, 1,6-hexanediol, preferably ethylene glycol, 1,3-propanediol or 1,4-butanediol; the monomer c may be selected from succinic acid, succinic anhydride, 1,5-glutaric acid, adipic acid, 1,10-sebacic acid or ester derivatives thereof, preferably succinic acid, succinic anhydride, dimethyl succinate, adipic acid or dimethyl adipate, particularly preferably 1,4-succinic acid, succinic anhydride, dimethyl succinate, 1,6-adipic acid or dimethyl 1,6-adipate; the monomer d may be selected from pyromellitic dianhydride, glycerol, pentaerythritol, glycidyl succinate, glycidyl adipate, glycidyl terephthalate, ethylene glycol glycidyl ether, 1,4-butanediol glycidyl ether, glycidic acid, glycidol, 3-hydroxyphthalic anhydride, 4-hydroxyphthalic anhydride, 3-hydroxymethylcaprolactone, a five-membered or six-membered cyclic carbonate with an alkylhydroxy group or an alkylcarboxyl group and the like, preferably pyromellitic dianhydride, glycerol or pentaerythritol.

Each monomer may be used in a conventional amount as long as the branched aliphatic-aromatic copolyester with corresponding melt index can be obtained, and preferably, the amounts of monomer a, monomer b, monomer c and monomer d are as follows: the molar ratio of (a+c) to b is 1:0.8-3, the molar ratio of (a+c) to d is 100-2000:1, the molar ratio of a to c is 0:100-95:5, preferably 0:100-60:40.

The branched aliphatic-aromatic copolyester is prepared as follows: under the action of a catalyst system, monomer a, monomer b, monomer c and monomer d are mixed for esterification or transesterification reaction, or the esterification or transesterification product of monomer a and monomer b and the esterification or transesterification product of monomer c and monomer d are mixed for copolycondensation reaction.

The branched aliphatic-aromatic copolyester has a melt index of 2-100 g/10 min, preferably 5-100 g/10 min at 190° C. under a load of 2.16 kg. Preferably, the branched aliphatic-aromatic copolyester is long branched.

According to the present invention, the organic peroxide is selected from organic peroxides having a half-life of 0.2-10 min, preferably 0.2-2 min, in the processing temperature range.

Further preferably, the organic peroxide is selected from dialkyl peroxides, diacyl peroxides or peroxyesters; the dialkyl peroxide is selected from dicumyl peroxide, 2,5-dimethyl-2,5-di(tert-butylperoxy)hexane or di(tert-butylperoxyisopropyl)benzene; the diacyl peroxide is selected from benzoyl peroxide or lauroyl peroxide.

In the present invention, the organic peroxide may be used in a conventional amount, for example, in an amount of 0.01 to 5 wt % based on the amount of the branched aliphatic-aromatic copolyester. Preferably, the organic peroxide is used in an amount of 0.01 to 1 wt % based on the amount of the branched aliphatic-aromatic copolyester.

Preferably, the copolyester has a melt index of 0.1 to 10 g/10 min at 190° C. under a load of 2.16 kg.

According to the present invention, the composition also comprises additives. The additives include an antioxidant, a slipping agent, an anti-blocking agent and a nucleating agent. The additives may also include an anti-UV agent, a water-blocking agent and the like.

The amount of the antioxidant is 0.05-5 parts, the amount of the slipping agent is 0.05-5 parts, the amount of the anti-blocking agent is 0.05-5 parts, and the amount of the nucleating agent is 0.1-20 parts based on 100 parts by weight of the copolyester.

In order to obtain a film blowing material with better performance, preferably, the amount of the antioxidant is 0.05-2 parts, the amount of the slipping agent is 0.05-2 parts, the amount of the anti-blocking agent is 0.05-2 parts, and the amount of the nucleating agent is 0.5-5 parts based on 100 parts by weight of the copolyester.

According to the present invention, any antioxidant conventionally used in the art may be used as the antioxidant. Preferably, the antioxidant is a mixture of a hindered phenol antioxidant and a phosphite antioxidant in a mass ratio of 1:1;
wherein the hindered phenol antioxidant may be selected from antioxidant 1010, antioxidant 1076, antioxidant 245 or antioxidant 246;
the phosphite antioxidant may be selected from triphenyl phosphate, trimethyl phosphate or antioxidant 168.

In the present invention, the slipping agent may be stearate or organic carboxylic acid amide, wherein the stearate may be calcium stearate and the like, and the organic carboxylic acid amide may be erucamide or oleamide.

Preferably, the anti-blocking agent is silica or talc.

Preferably, the nucleating agent is selected from hyperbranched polyamides, low density polyethylene or ethylene-methacrylic acid ionomers.

According to the second aspect of the invention, the invention provides a method for preparing the biodegradable film, the method comprising the steps of:
1) preparing a copolyester by extrusion reaction of a branched aliphatic-aromatic copolyester derived from monomer a, monomer b, monomer c and monomer d with an organic peroxide;
the monomer a is an aromatic dibasic acid or an ester derivative thereof; the monomer b is one or more of $C_2$-$C_{10}$ aliphatic dihydric alcohols or $C_3$-$C_{10}$ alicyclic dihydric alcohols; the monomer c is a $C_4$-$C_{20}$ aliphatic dibasic acid or an ester derivative thereof; the monomer d is one or more of polyols with a functionality of more than 2, polycarboxylic acids with a functionality of more than 2, anhydrides with a functionality of more than 2, epoxy compounds or anhydrides with hydroxyl or carboxyl group, glycidyl ester, glycidyl ether, glycidol, lactones or cyclic carbonates with hydroxyl or carboxyl side group;
2) extruding and granulating the copolyester obtained in the step 1) to obtain a composition; preferably, the composition is a film blowing material; and
3) blowing the composition to obtain the biodegradable film.

In the present invention, the branched aliphatic-aromatic copolyester is obtained by reacting monomer a, monomer b, monomer c and monomer d under the action of a catalyst system containing a second catalyst. The second catalyst is a compound of $RE(R^3)_3$, wherein RE is a rare earth metal element, $R^3$ is at least one selected from the group consisting of halogen, alkoxy group, aryloxy group, acetylacetone group and $R^4COO$— group, wherein $R^4$ is $C_1$-$C_{30}$ alkyl group. Preferably, RE is lanthanum, cerium, praseodymium, neodymium, terbium, ytterbium, dysprosium, samarium or scandium; the halogen is chlorine or bromine, the alkoxy group is $C_3$-$C_6$ alkoxy group, the aryloxy group is aryloxy group comprising at least one benzene ring and/or naphthalene ring, and $R^4$ is $C_1$-$C_{20}$ alkyl group. Further preferably, RE is selected from lanthanum, cerium, praseodymium, neodymium or scandium, the halogen is chlorine or bromine, the alkyl group in the alkoxy group is isopropyl group, n-butyl group or isopentyl group, the aryl group in the aryloxy group is 2,6-di-tert-butyl-4-methylphenyl group or 4-butylphenyl group, and $R^4$ is $C_3$-$C_{18}$ alkyl group. More preferably, the second catalyst is one or more selected from the group consisting of lanthanum acetylacetonate, neodymium acetylacetonate, neodymium isopropoxide, lanthanum isopropoxide, scandium isopropoxide, lanthanum stearate, neodymium stearate, lanthanum chloride, tris(2,6-di-tert-butyl-4-methylphenoxy) lanthanum, and hydrates thereof.

In the present invention, the catalyst system further comprises a first catalyst and/or a third catalyst.

The first catalyst is one or more selected from the group consisting of an oxide of M, $M(OR^1)_n$ and $M(OOCR^2)_m$, wherein M is titanium, antimony or zinc, n and m are each independently the valence of M, $R^1$ is $C_1$-$C_{10}$ alkyl group, and $R^2$ is $C_1$-$C_{20}$ alkyl group. Preferably, the first catalyst is at least one selected from the group consisting of titanium alkoxide, antimony acetate, zinc acetate, zinc oxide, antimony oxide and titanium oxide. More preferably, the first catalyst is at least one selected from the group consisting of tetrabutyl titanate ($Ti(OC_4H_9)_4$), titanium isopropoxide, titanium dioxide, antimony trioxide, antimony acetate and zinc acetate.

The third catalyst is at least one organotin compound. Preferably, the third catalyst is at least one selected from the group consisting of dibutyltin oxide, methylphenyltin oxide, tetraethyltin, hexaethyltin oxide, hexacyclohexylditin oxide, didodecyltin oxide, triethylhydroxytin, triphenylhydroxytin, triisobutyltin acetate, dibutyltin diacetate, diphenyltin dilaurate, monobutyltin trichloride, tributyltin chloride, dibutyltin sulfide, butylhydroxytin oxide, methyl stannoic acid, ethyl stannoic acid and butyl stannoic acid. Further preferably, the third catalyst is a mixture of at least two selected from the group consisting of dibutyltin oxide, tetraethyltin, triphenylhydroxytin, dibutyltin diacetate, diphenyltin dilaurate, monobutyltin trichloride, tributyltin chloride, dibutyltin sulfide, butylhydroxytin oxide, methyl stannoic acid, ethyl stannoic acid and butyl stannoic acid. In this case, the amount of each component of the third catalyst may be 10 to 90 mol %, preferably 30 to 70 mol %.

In the present invention, the molar ratio of the catalyst in its entirety to the monomer (a+c) is 1:1000-20000, and the molar ratio of the first catalyst to the second catalyst to the third catalyst is 0-20:0.1-10: 0-1, preferably 0.1-20:0.1-10:1.

The monomer a may be selected from terephthalic acid, dimethyl terephthalate, phthalic acid, toluene dicarboxylic acid, naphthalene dicarboxylic acid, preferably terephthalic acid or dimethyl terephthalate; the monomer b may be selected from ethylene glycol, 1,3-propanediol, 1,4-butanediol, 1,5-pentanediol, 1,6-hexanediol, preferably 1,3-propanediol or 1,4-butanediol; the monomer c may be selected from succinic acid, succinic anhydride, 1,5-glutaric acid, adipic acid, 1,10-sebacic acid or ester derivatives thereof, preferably succinic acid, succinic anhydride, dimethyl succinate, adipic acid or dimethyl adipate, particularly preferably 1,4-succinic acid, succinic anhydride, dimethyl succinate, 1,6-adipic acid or dimethyl 1,6-adipate; the monomer d may be selected from pyromellitic dianhydride, glycerol, pentaerythritol, glycidyl succinate, glycidyl adipate, glycidyl terephthalate, ethylene glycol glycidyl ether, 1,4-butanediol glycidyl ether, glycidic acid, glycidol, 3-hydroxyphthalic anhydride, 4-hydroxyphthalic anhydride, 3-hydroxymethylcaprolactone, five-membered, six-membered cyclic carbonates with an alkylhydroxy group or an alkylcarboxyl group and the like, preferably pyromellitic dianhydride, glycerol or pentaerythritol.

In order to obtain a branched aliphatic-aromatic copolyester with better performance, preferably, the amounts of monomer a, monomer b, monomer c and monomer d are as follows: the molar ratio of (a+c) to b is 1:0.8-3, the molar ratio of (a+c) to d is 100-2000:1, the molar ratio of a to c is 0:100-95:5, preferably 0:100-60:40, wherein a+c represents the total amount of the monomer a and the monomer c.

In the present invention, the branched aliphatic-aromatic copolyester is prepared as follows: under the action of a catalyst system, monomer a, monomer b, monomer c and monomer d are mixed for esterification or transesterification reaction, or the esterification or transesterification product of monomer a and monomer b and the esterification or transesterification product of monomer c and monomer d are mixed for copolycondensation reaction.

In the present invention, the conditions of the esterification or transesterification reaction and the polycondensation reaction may be conventionally selected according to the prior art. For example, the temperature of the esterification or transesterification reaction may be 150-230° C., preferably 150-220° C., and the reaction may be carried out for 2-4 hours under normal pressure or slight negative pressure; the polycondensation reaction conditions include: the temperature is 230-270° C., preferably 235-260° C., more preferably 250-270° C., the pressure is 20-1000 Pa, and the time is 2-6 hours, preferably 2-3 hours.

The branched aliphatic-aromatic copolyester has a melt index of 2-100 g/10 min, preferably 5-100 g/10 min at 190° C. under a load of 2.16 kg.

Preferably, the extrusion temperature in the step 1) is 130-190° C. from low to high in various zones of the extruder, preferably the extrusion temperature is 150-180° C., and more preferably the extrusion temperature is 160-180° C.

Preferably, the copolyester obtained in the step 1) has a melt index of 0.1-10 g/10 min at 190° C. under a load of 2.16 kg.

In the present invention, the copolyester is also mixed with additives in the step 2), wherein the additives include an antioxidant, a slipping agent, an anti-blocking agent and a nucleating agent. The additives may also include an anti-UV agent, a water-blocking agent and the like.

In the present invention, the antioxidant, slipping agent, anti-blocking agent and nucleating agent may be used in the amounts conventionally used in the art. The amount of the antioxidant is 0.05-5 parts, the amount of the slipping agent is 0.05-5 parts, the amount of the anti-blocking agent is 0.05-5 parts, and the amount of the nucleating agent is 0.1-20 parts based on 100 parts by weight of the copolyester. Preferably, the amount of the antioxidant is 0.05-2 parts, the amount of the slipping agent is 0.05-2 parts, the amount of the anti-blocking agent is 0.05-2 parts, and the amount of the nucleating agent is 0.5-5 parts based on 100 parts by weight of the copolyester.

According to the present invention, any antioxidant conventionally used in the art may be used as the antioxidant. Preferably, the antioxidant is a mixture of a hindered phenol antioxidant and a phosphite antioxidant in a mass ratio of 1:1; wherein the hindered phenol antioxidant is selected from antioxidant 1010, antioxidant 1076, antioxidant 245 or antioxidant 246; the phosphite antioxidant may be selected from triphenyl phosphate, trimethyl phosphate or antioxidant 168.

In the present invention, the slipping agent may be stearate or organic carboxylic acid amide, wherein the stearate may be calcium stearate and the like, and the organic carboxylic acid amide may be erucamide or oleamide.

Preferably, the anti-blocking agent is silica or talc.

Preferably, the nucleating agent is selected from hyperbranched polyamides, low density polyethylene or ethylene-methacrylic acid ionomers.

Preferably, in the step 2), the extrusion temperature is 130-190° C., preferably 150-190° C., and more preferably 160-180° C.

Preferably, in the step 3), the blow-up ratio is 3-8, and the film blowing temperature is 150-180° C.

Preferably, the invention provides a method for preparing the biodegradable film, the method comprising the steps of:
1) preparation of a branched aliphatic-aromatic copolyester: under the action of a catalyst system, monomer a, monomer b, monomer c and monomer d are mixed for esterification or transesterification reaction, or the esterification or transesterification product of monomer a and monomer b and the esterification or transesterification product of monomer c and monomer d are mixed for copolycondensation reaction;
the monomer a is an aromatic dibasic acid or an ester derivative thereof; the monomer b is one or more of $C_2$-$C_{10}$ aliphatic dihydric alcohols or $C_3$-$C_{10}$ alicyclic dihydric alcohols; the monomer c is a $C_4$-$C_{20}$ aliphatic dibasic acid or an ester derivative thereof; the monomer d is one or more of polyols with a functionality of more than 2, polycarboxylic acids with a functionality of more than 2, or anhydrides with a functionality of more than 2;
2) performing extrusion reaction of the branched aliphatic-aromatic copolyester prepared in the step 1) with an organic peroxide to prepare a copolyester;
3) mixing the copolyester obtained in the step 2) with an antioxidant, a slipping agent, an anti-blocking agent and a nucleating agent, and performing extrusion and granulation to prepare a film blowing material; and
4) blowing molding the film blowing material to obtain the biodegradable film.

According to the third aspect of the invention, the invention provides a copolyester, which is obtained by extrusion reaction of a branched aliphatic-aromatic copolyester derived from monomer a, monomer b, monomer c and monomer d with an organic peroxide, wherein the monomer a is an aromatic dibasic acid or an ester derivative thereof; the monomer b is one or more of $C_2$-$C_{10}$ aliphatic dihydric alcohols or $C_3$-$C_{10}$ alicyclic dihydric alcohols; the monomer c is a $C_4$-$C_{20}$ aliphatic dibasic acid or an ester derivative thereof; the monomer d is one or more of polyols with a functionality of more than 2, polycarboxylic acids with a functionality of more than 2, anhydrides with a functionality of more than 2, epoxy compounds or anhydrides with hydroxyl or carboxyl group, glycidyl ester, glycidyl ether, glycidol, lactones or cyclic carbonates with hydroxyl or carboxyl side group. The features of the copolyester are as described above in the first aspect for the copolyester of the biodegradable film.

The biodegradable film of the invention is a high strength ultra-thin biodegradable film having one or more of the following properties:
- a) thickness of 4-50 μm;
- b) density of 1.20-1.26 g/cm$^3$;
- c) haze of 40%-90%;
- d) surface haze of 39%-89%;
- e) internal haze of 1%-50%;
- f) light transmittance of 80%-95%;
- g) water permeability of 100-3000 g/m$^2$/day;
- h) dart impact of 20-600 N;
- i) yield point of 4%-60%;
- j) tensile load of 1-50 N;
- k) tensile strength at yield of 4-25 MPa;
- l) tensile strength at break of 6-200 MPa;
- m) elongation at break of 20%-2000%; and
- n) right angle tear load of 0.04-10 N.

The parameters not defined in the present invention are all common technical means in the art.

The invention is further described below in connection with the examples. The invention, however, is not limited by these examples.

The data in the following examples and comparative examples are determined according to the following methods:

The molecular weight and molecular weight distribution of the polymer are determined by gel permeation chromatography (GPC), using tetrahydrofuran (THF) as a solvent, on a Waters-208 instrument (with a Waters 2410 RI detector, at flow rate 1.5 mL/min, 30° C.), the molecular weight being calibrated with styrene standard.

The crystallization temperature (Tc), melting temperature (Tm) and glass transition temperature (Tg) of the polymer are determined by differential scanning calorimetry (DSC), wherein each sample is heated from −100° C. to 250° C. on a Perkin Elmer Pyris 1 tester, and subjected to two heating scans and one cooling scan, at ramping rate of 20° C./min, Tm and Tg being taken from the second heating scan, and Tc being taken from the cooling scan.

The melt index (MI) of the polymer is determined using a CS-127 type melt index tester, manufactured by American Scientific Instruments Co., at 190° C. under a load of 2.16 kg according to the standard ISO1133-2005 «Determination of the Melt Mass-Flow Rate and the Melt Volume-Flow Rate of Thermoplastics».

The density is determined according to the method GB/T4472-2011.

The light transmittance, total haze and internal haze are all determined using a WGT-S type light transmittance/haze tester, manufactured by Shanghai Shenguang Instrument Co., Ltd., according to the standard GB/T2410-2008, and the surface haze is equal to the total haze minus the internal haze.

The water permeability is determined using a Permatran-W3/34 type water vapor permeability tester, manufactured by MOCON Co., according to the standard GB/T26253-2010.

The dart impact strength is determined using a dart impact tester, manufactured by Noselabats Co., according to the standard ASTM D1709.

The yield point, tensile load, tensile strength at yield, tensile strength at break and elongation at break are determined using an AGS-X type tensile tester, manufactured by Shimadzu Co., according to the standard GBT 13022-1991.

The right angle tear load is determined using an AGS-X type tensile tester, manufactured by Shimadzu Co., according to the standard QB/T1130-1991.

For the xenon lamp aging test, an X-65 type xenon lamp weathering box is used, wherein the lamp source is 340 nm UV-A, the period is 4 hours, 0.80 W/m$^2$, 55° C.; 2 hours, dark dew, 45° C. The test is carried out according to the standard GB/T16422.2-2014, and the total test time is 208 hours.

The sources of chemicals used in the following examples and comparative examples are shown in Table a.

TABLE a

| Chemical name | Source |
| --- | --- |
| Terephthalic acid | Shanghai Hatch Chemical Co., Ltd. |
| Dimethyl terephthalate | Beijing Xingjin Chemical Plant |
| 1,4-Butanediol | Tianjin Guangfu Fine Chemical Research Institute |
| 1,3-Propanediol | Sinopharm Chemical Reagent Co., Ltd. |
| Succinic acid | Anhui Sanxin Chemical Co., Ltd. |
| Dimethyl succinate | Beijing Chemical Agents Co. |
| Adipic acid | Sinopharm Chemical Reagent Co., Ltd. |
| Glycerol | Beijing InnoChem Science & Technology Co., Ltd. |
| Pyromellitic dianhydride | Sinopharm Chemical Reagent Co., Ltd. |
| Pentaerythritol | Sinopharm Chemical Reagent Co., Ltd. |
| Tetrabutyl titanate | Beijing Chemical Agents Co. |
| Lanthanum stearate | Self-made* |
| Dibutyltin oxide | Beijing No. 3 Chemical Plant |
| Triphenylhydroxytin | Beijing Chemical Agents Co. |
| Benzoyl peroxide | Sinopharm Chemical Reagent Co., Ltd. |
| Lauroyl peroxide | Sinopharm Chemical Reagent Co., Ltd. |
| Antioxidant 1010 | Beijing J&K Scientific Co., Ltd. |
| Antioxidant 168 | Beijing J&K Scientific Co., Ltd. |
| Antioxidant 246 | Beijing J&K Scientific Co., Ltd. |
| Triphenyl phosphate | Beijing J&K Scientific Co., Ltd. |
| Slipping agent erucamide | Beijing J&K Scientific Co., Ltd |
| Slipping agent calcium stearate | Beijing J&K Scientific Co., Ltd. |
| Anti-blocking agent silica | Sinopharm Chemical Reagent Co., Ltd. |
| Anti-blocking agent talc | Sinopharm Chemical Reagent Co., Ltd. |
| Nucleating agent DuPont Surlyn8920 | DuPont Co. |

*Lanthanum stearate is prepared according to the Chinese patent application No. ZL 200510135517.2. Specifically, as described in Example A5, a calculated amount of $Ln_2O_3$ was weighed in a beaker, an appropriate amount of distilled water was added, then an excess amount of HCl was added and heated to dissolve the compound as a clear solution s3; an excess amount of stearic acid was weighed in another beaker, an appropriate amount of absolute ethanol was added and heated to form a clear solution s4; the solutions s4 and s3 were added successively to a 100 ml round-bottomed flask, then 10 mg of a phase transfer catalyst tetrabutylammonium bromide and a magneton were added. A condensate pipe was connected to the top of the flask, which was protected by nitrogen gas. The system was heated in an oil bath at a temperature of less than 100° C., with magnetic stirring for about 5 hours. The flask was taken off, the reaction solution was separated in a separatory funnel, and then the lower clear liquid was collected and evaporated to dryness.

Examples 1-8 are used to illustrate the biodegradable film of the invention and its preparation method.

EXAMPLE 1

A method for preparing the biodegradable film, the method comprising the steps of:
1) preparation of a branched aliphatic-aromatic copolyester: under the action of a catalyst, 423.8 g (2.55 mol) of monomer a terephthalic acid (PTA), 650 g (7.21 mol) of monomer b 1,4-butanediol (BDO), 330 g (2.79 mol) of monomer c succinic acid (SA) and 1 g (0.01 mol) of monomer d glycerol were mixed to react in a reaction kettle (esterification at 150-230° C. and polycondensation at 230-260° C.), the prepared branched aliphatic-aromatic copolyester having a melt index of 23 g/10 min at 190° C. under a load of 2.16 kg, wherein the catalyst contained 0.245 g of tetrabutyl titanate, 0.31 g of lanthanum stearate, 0.1 g of dibutyltin oxide and 0.14 g of triphenylhydroxytin;
2) 500 g of the branched aliphatic-aromatic copolyester prepared in the step 1) and 2.5 g of benzoyl peroxide were subjected to extrusion reaction in a German Kekuron zsk25 twin-screw extruder, wherein various sections were at the temperatures of 130-150-170° C., to prepare a copolyester, the prepared copolyester having a melt index of 2.2 g/10 min at 190° C. under a load of 2.16 kg;
3) 500 g of the copolyester prepared in the step 2) was mixed with 1 g of antioxidant 1010, 1 g of antioxidant 168, 2.25 g of slipping agent erucamide, 2.25 g of anti-blocking agent silica and 10 g of nucleating agent Dupont Surlyn8920 resin, and subjected to melt extrusion in a German Kekuron zsk25 twin-screw extruder and granulation, wherein various sections were at the temperatures of 130-150-170° C., to obtain a film blowing material;
4) the film blowing material was blown on a German Collin ep30 film blowing machine at the film blowing temperature of 150-190° C., at a blow-up ratio of 5-8, to obtain a film with a thickness of 10 μm.

The obtained film was subjected to performance tests, and the test results of optical property, thermal property, barrier property and aging property were shown in Table 1, and the mechanical properties were shown in Table 2.

EXAMPLE 2

A method for preparing the biodegradable film, the method comprising the steps of:
1) preparation of a branched aliphatic-aromatic copolyester: under the action of a catalyst, 423.8 g (2.55 mol) of monomer a terephthalic acid (PTA), 570.8 g (7.5 mol) of monomer b 1,3-propanediol, 438.4 g (3 mol) of monomer c dimethyl succinate and 1 g (0.0046 mol) of monomer d pyromellitic dianhydride were mixed to react, the prepared branched aliphatic-aromatic copolyester having a melt index of 15 g/10 min at 190° C. under a load of 2.16 kg, wherein the catalyst contained 0.245 g of tetrabutyl titanate, 0.31 g of lanthanum stearate, 0.1 g of dibutyltin oxide and 0.14 g of triphenylhydroxytin;
2) 500 g of the branched aliphatic-aromatic copolyester prepared in the step 1) and 2.5 g of benzoyl peroxide were subjected to extrusion reaction in the extruder at the temperature of 170° C., to prepare a copolyester, the prepared copolyester having a melt index of 1.8 g/10 min at 190° C. under a load of 2.16 kg;
3) 500 g of the copolyester prepared in the step 2) was mixed with 1 g of antioxidant 1010, 1 g of antioxidant 168, 2.25 g of slipping agent erucamide, 2.25 g of anti-blocking agent silica and 10 g of nucleating agent Dupont Surlyn8920 resin, and subjected to melt extrusion in the twin-screw extruder at the temperature of 170° C. and granulation, to obtain a film blowing material;
4) the film blowing material was blown on the film blowing machine, to obtain a film with a thickness of 10 μm.

Regarding the conditions and devices in the above steps 1)-4), please refer to the corresponding steps in Example 1.

The obtained film was subjected to performance tests, and the test results of optical property, thermal property, barrier property and aging property were shown in Table 1, and the mechanical properties were shown in Table 2.

EXAMPLE 3

A method for preparing the biodegradable film, the method comprising the steps of:
1) preparation of a branched aliphatic-aromatic copolyester: under the action of a catalyst, 679.6 g (3.5 mol) of monomer a dimethyl terephthalate, 570.8 g (7.5 mol) of monomer b 1,3-propanediol, 657.6 g (4.5 mol) of monomer c adipic acid and 0.7 g (0.005 mol) of monomer d pentaerythritol were mixed to react, the prepared branched aliphatic-aromatic copolyester having a melt index of 40 g/10 min at 190° C. under a load of 2.16 kg, wherein the catalyst contained 0.245 g of tetrabutyl titanate, 0.31 g of lanthanum stearate, 0.1 g of dibutyltin oxide and 0.14 g of triphenylhydroxytin;
2) 500 g of the branched aliphatic-aromatic copolyester prepared in the step 1) and 2.5 g of benzoyl peroxide were subjected to extrusion reaction in the extruder at the temperature of 170° C., to prepare a copolyester, the prepared copolyester having a melt index of 2.8 g/10 min at 190° C. under a load of 2.16 kg;
3) 500 g of the copolyester prepared in the step 2) was mixed with 1 g of antioxidant 1010, 1 g of antioxidant 168, 2.25 g of slipping agent erucamide, 2.25 g of anti-blocking agent silica and 10 g of nucleating agent Dupont Surlyn8920 resin, and subjected to melt extrusion in the twin-screw extruder at the temperature of 170° C. and granulation, to obtain a film blowing material:
4) the film blowing material was blown on the film blowing machine, to obtain a film with a thickness of 10 μm.

Regarding the conditions and devices in the above steps 1)-4), please refer to the corresponding steps in Example 1.

The obtained film was subjected to performance tests, and the test results of optical property, thermal property, barrier property and aging property were shown in Table 1, and the mechanical properties were shown in Table 2.

EXAMPLE 4

A method for preparing the biodegradable film, the method comprising the steps of:
1) preparation of a branched aliphatic-aromatic copolyester: under the action of a catalyst, 423.8 g (2.55 mol) of monomer a terephthalic acid (PTA), 650 g (7.21 mol) of monomer b 1,4-butanediol (BDO), 330 g (2.79 mol) of monomer c succinic acid (SA) and 1 g (0.01 mol) of monomer d glycerol were mixed to react, the prepared branched aliphatic-aromatic copolyester having a melt index of 40 g/10 min at 190° C. under a load of 2.16 kg, wherein the catalyst contained 0.174 g of tetrabutyl titanate, 0.071 g of dibutyltin oxide, 0.099 g of triphenylhydroxytin and 0.22 g of lanthanum stearate;

2) 500 g of the branched aliphatic-aromatic copolyester prepared in the step 1) and 5 g of lauroyl peroxide were subjected to extrusion reaction in the extruder at the temperature of 180° C., to prepare a copolyester, the prepared copolyester having a melt index of 2.6 g/10 min at 190° C. under a load of 2.16 kg;

3) 500 g of the copolyester prepared in the step 2) was mixed with 1 g of antioxidant 1010, 1 g of antioxidant 168, 2.25 g of slipping agent erucamide, 2.25 g of anti-blocking agent silica and 10 g of nucleating agent Dupont Surlyn8920 resin, and subjected to melt extrusion in the twin-screw extruder at the temperature of 180° C. and granulation, to obtain a film blowing material;

4) the film blowing material was blown on the film blowing machine, to obtain a film with a thickness of 10 μm.

Regarding the conditions and devices in the above steps 1)-4), please refer to the corresponding steps in Example 1.

The obtained film was subjected to performance tests, and the test results of optical property, thermal property, barrier property and aging property were shown in Table 1, and the mechanical properties were shown in Table 2.

EXAMPLE 5

A method for preparing the biodegradable film, the method comprising the steps of:

1) preparation of a branched aliphatic-aromatic copolyester: under the action of a catalyst, 423.8 g (2.55 mol) of monomer a terephthalic acid, 570.8 g (7.5 mol) of monomer b 1,3-propanediol, 438.4 g (3 mol) of monomer c dimethyl succinate and 1 g (0.0046 mol) of monomer d pyromellitic dianhydride were mixed to react, the prepared branched aliphatic-aromatic copolyester having a melt index of 80 g/10 min at 190° C. under a load of 2.16 kg, wherein the catalyst contained 0.245 g of tetrabutyl titanate, 0.31 g of lanthanum stearate, 0.1 g of dibutyltin oxide and 0.14 g of triphenylhydroxytin;

2) 500 g of the branched aliphatic-aromatic copolyester prepared in the step 1) and 0.5 g of benzoyl peroxide were subjected to extrusion reaction in the extruder at the temperature of 160° C., to prepare a copolyester, the prepared copolyester having a melt index of 1.5 g/10 min at 190° C. under a load of 2.16 kg.

3) 500 g of the copolyester prepared in the step 2) was mixed with 1 g of antioxidant 1010, 1 g of antioxidant 168, 2.25 g of slipping agent erucamide, 2.25 g of anti-blocking agent silica and 10 g of nucleating agent Dupont Surlyn8920 resin, and subjected to melt extrusion in the twin-screw extruder at the temperature of 160° C. and granulation, to obtain a film blowing material;

4) the film blowing material was blown on the film blowing machine, to obtain a film with a thickness of 10 μm.

Regarding the conditions and devices in the above steps 1)-4), please refer to the corresponding steps in Example 1.

The obtained film was subjected to performance tests, and the test results of optical property, thermal property, barrier property and aging property were shown in Table 1, and the mechanical properties were shown in Table 2.

EXAMPLE 6

A method for preparing the biodegradable film, the method comprising the steps of:

1) preparation of a branched aliphatic-aromatic copolyester: under the action of a catalyst, 423.8 g (2.55 mol) of monomer a terephthalic acid (PTA), 650 g (7.21 mol) of monomer b 1,4-butanediol (BDO), 330 g (2.79 mol) of monomer c succinic acid (SA) and 1 g (0.01 mol) of monomer d glycerol were mixed to react, the prepared branched aliphatic-aromatic copolyester having a melt index of 25 g/10 min at 190° C. under a load of 2.16 kg, wherein the catalyst contained 0.245 g of tetrabutyl titanate, 0.31 g of lanthanum stearate, 0.1 g of dibutyltin oxide and 0.14 g of triphenylhydroxytin;

2) 500 g of the branched aliphatic-aromatic copolyester prepared in the step 1) and 2.5 g of benzoyl peroxide were subjected to extrusion reaction in the extruder at the temperature of 170° C., to prepare a copolyester, the prepared copolyester having a melt index of 1.8 g/10 min at 190° C. under a load of 2.16 kg;

3) 500 g of the copolyester prepared in the step 2) was mixed with 1.5 g of antioxidant 246, 1.5 g of triphenyl phosphate, 1 g of slipping agent calcium stearate, 1 g of anti-blocking agent talc and 5 g of nucleating agent Dupont Surlyn8920 resin, and subjected to melt extrusion in the twin-screw extruder at the temperature of 170° C. and granulation, to obtain a film blowing material;

4) the film blowing material was blown on the film blowing machine, to obtain a film with a thickness of 10 μm.

Regarding the conditions and devices in the above steps 1)-4), please refer to the corresponding steps in Example 1.

The obtained film was subjected to performance tests, and the test results of optical property, thermal property, barrier property and aging property were shown in Table 1, and the mechanical properties were shown in Table 2.

EXAMPLE 7

A method for preparing the biodegradable film, the method comprising the steps of: 1) preparation of a branched aliphatic-aromatic copolyester: under the action of a catalyst, 423.8 g (2.55 mol) of monomer a terephthalic acid (PTA) and 650 g (7.21 mol) of monomer b 1,4-butanediol (BDO) were subjected to esterification reaction, 330 g (2.79 mol) of monomer c succinic acid (SA) and 1 g (0.01 mol) of monomer d glycerol were subjected to esterification reaction, and then the two esterification products were mixed to carry out copolycondensation reaction, the prepared branched aliphatic-aromatic copolyester having a melt index of 42 g/10 min at 190° C. under a load of 2.16 kg, wherein the catalyst contained 0.245 g of tetrabutyl titanate, 0.31 g of lanthanum stearate, 0.1 g of dibutyltin oxide and 0.14 g of triphenylhydroxytin;

2) 500 g of the branched aliphatic-aromatic copolyester prepared in the step 1) and 2.5 g of benzoyl peroxide were subjected to extrusion reaction in the extruder at the temperature of 170° C., to prepare a copolyester, the prepared copolyester having a melt index of 2.4 g/10 min at 190° C. under a load of 2.16 kg;

3) 500 g of the copolyester prepared in the step 2) was mixed with 1 g of antioxidant 1010, 1 g of antioxidant 168, 2.25 g of slipping agent erucamide, 2.25 g of anti-blocking agent silica and 10 g of nucleating agent Dupont Surlyn8920 resin, and subjected to melt extrusion in the twin-screw extruder at the temperature of 170° C. and granulation, to obtain a film blowing material;
4) the film blowing material was blown on the film blowing machine, to obtain a film with a thickness of 10 μm.

Regarding the conditions and devices in the above steps 1)-4), please refer to the corresponding steps in Example 1.

The obtained film was subjected to performance tests, and the test results of optical property, thermal property, barrier property and aging property were shown in Table 1, and the mechanical properties were shown in Table 2.

EXAMPLE 8

1) preparation of a branched aliphatic-aromatic copolyester: under the action of a catalyst, 423.8 g (2.55 mol) of monomer a terephthalic acid (PTA) and monomer b 650 g (7.21 mol) of 1,4-butanediol (BDO) were subjected to esterification reaction, 330 g (2.79 mol) of monomer c succinic acid (SA) and 1 g (0.01 mol) of monomer d glycerol were subjected to esterification reaction, and then the two esterification products were mixed to carry out copolycondensation reaction, the prepared branched aliphatic-aromatic copolyester having a melt index of 80 g/10 min at 190° C. under a load of 2.16 kg, wherein the catalyst was 0.62 g of lanthanum stearate;
2) 500 g of the branched aliphatic-aromatic copolyester prepared in the step 1) and 3.6 g of benzoyl peroxide were subjected to extrusion reaction in the extruder at the temperature of 170° C., to prepare a copolyester, the prepared copolyester having a melt index of 3.2 g/10 min at 190° C. under a load of 2.16 kg;
3) 500 g of the copolyester prepared in the step 2) was mixed with 1 g of antioxidant 1010, 1 g of antioxidant 168, 2.25 g of slipping agent erucamide, 2.25 g of anti-blocking agent silica and 10 g of nucleating agent Dupont Surlyn8920 resin, and subjected to melt extrusion in the twin-screw extruder at the temperature of 170° C. and granulation, to obtain a film blowing material;
4) the film blowing material was blown on the film blowing machine, to obtain a film with a thickness of 10 μm.

Regarding the conditions and devices in the above steps 1)-4), please refer to the corresponding steps in Example 1.

The obtained film was subjected to performance tests, and the test results of optical property, thermal property, barrier property and aging property were shown in Table 1, and the mechanical properties were shown in Table 2.

COMPARATIVE EXAMPLE 1

A method for preparing the biodegradable film, the method comprising the steps of:
1) preparation of a branched aliphatic-aromatic copolyester: under the action of a catalyst, 423.8 g (2.55 mol) of monomer a terephthalic acid (PTA), 650 g (7.21 mol) of monomer b 1,4-butanediol (BDO), 330 g (2.79 mol) of monomer c succinic acid (SA) and 1 g (0.01 mol) of monomer d glycerol were mixed to react, the prepared branched aliphatic-aromatic copolyester having a melt index of 20 g/10 min at 190° C. under a load of 2.16 kg, wherein the catalyst contained 0.245 g of tetrabutyl titanate, 0.31 g of lanthanum stearate, 0.1 g of dibutyltin oxide and 0.14 g of triphenylhydroxytin;
2) 500 g of the branched aliphatic-aromatic copolyester prepared in the step 1) was mixed with 1 g of antioxidant 1010, 1 g of antioxidant 168, 2.25 g of slipping agent erucamide, 2.25 g of anti-blocking agent silica and 10 g of nucleating agent Dupont Surlyn8920 resin, and subjected to melt extrusion in the twin-screw extruder at the temperature of 170° C. and granulation, to obtain a film blowing material;
3) the film blowing material was blown on the film blowing machine, to obtain a film with a thickness of 10 μm.

Regarding the conditions and devices in the above steps 1)-3), please refer to the corresponding steps in Example 1.

The obtained film was subjected to performance tests, and the test results of optical property, thermal property, barrier property and aging property were shown in Table 1, and the mechanical properties were shown in Table 2.

COMPARATIVE EXAMPLE 2

A method for preparing the biodegradable film, the method comprising the steps of:
1) preparation of an aliphatic-aromatic copolyester: under the action of a catalyst, 423.8 g (2.55 mol) of monomer a terephthalic acid (PTA), 650 g (7.21 mol) of monomer b 1,4-butanediol (BDO) and 330 g (2.79 mol) of monomer c succinic acid (SA) were mixed to react, the prepared aliphatic-aromatic copolyester having a melt index of 30 g/10 min at 190° C. under a load of 2.16 kg, wherein the catalyst contained 0.245 g of tetrabutyl titanate, 0.31 g of lanthanum stearate, 0.1 g of dibutyltin oxide and 0.14 g of triphenylhydroxytin;
2) 500 g of the aliphatic-aromatic copolyester prepared in the step 1) and 2.5 g of benzoyl peroxide were subjected to extrusion reaction in the extruder at the temperature of 170° C., to prepare a copolyester, the prepared copolyester having a melt index of 5 g/10 min at 190° C. under a load of 2.16 kg;
3) 500 g of the copolyester prepared in the step 2) was mixed with 1 g of antioxidant 1010, 1 g of antioxidant 168, 2.25 g of slipping agent erucamide, 2.25 g of anti-blocking agent silica and 10 g of nucleating agent Dupont Surlyn8920 resin, and subjected to melt extrusion in the twin-screw extruder at the temperature of 170° C. and granulation, to obtain a film blowing material;
4) the film blowing material was blown on the film blowing machine, to obtain a film with a thickness of 10 μm.

Regarding the conditions and devices in the above steps 1)-4), please refer to the corresponding steps in Example 1.

The obtained film was subjected to performance tests, and the test results of optical property, thermal property, barrier property and aging property were shown in Table 1, and the mechanical properties were shown in Table 2.

COMPARATIVE EXAMPLE 3

A method for preparing the biodegradable film, the method comprising the steps of:
1) preparation of a branched aliphatic-aromatic copolyester: under the action of a catalyst, 423.8 g (2.55 mol) of monomer a terephthalic acid (PTA) and 650 g (7.21 mol) of monomer b 1,4-butanediol (BDO) were subjected to esterification reaction, followed by the reaction with 330 g (2.79 mol) of monomer c succinic acid (SA) and 1 g (0.01 mol) of monomer d glycerol, the prepared branched aliphatic-aromatic copolyester having a melt index of 100 g/10 min at 190° C. under a load of 2.16 kg, wherein the catalyst was 0.45 g of tetrabutyl titanate;

2) 500 g of the branched aliphatic-aromatic copolyester prepared in the step 1) and 2.5 g of benzoyl peroxide were subjected to extrusion reaction in the extruder at the temperature of 170° C., to prepare a copolyester, the prepared copolyester having a melt index of 5 g/10 min at 190° C. under a load of 2.16 kg;

3) 500 g of the copolyester prepared in the step 2) was mixed with 1 g of antioxidant 1010, 1 g of antioxidant 168, 2.25 g of slipping agent erucamide, 2.25 g of anti-blocking agent silica and 10 g of nucleating agent Dupont Surlyn8920 resin, and subjected to melt extrusion in the twin-screw extruder at the temperature of 170° C. and granulation, to obtain a film blowing material;

4) the film blowing material was blown on the film blowing machine, to obtain a film with a thickness of 10 μm.

Regarding the conditions and devices in the above steps 1)-4), please refer to the corresponding steps in Example 1.

The obtained film was subjected to performance tests, and the test results of optical property, thermal property, barrier property and aging property were shown in Table 1, and the mechanical properties were shown in Table 2.

COMPARATIVE EXAMPLE 4

A method for preparing the biodegradable film, the method comprising the steps of:

1) preparation of an aliphatic-aromatic copolyester: under the action of a catalyst, 423.8 g (2.55 mol) of monomer a terephthalic acid (PTA), 650 g (7.21 mol) of monomer b 1,4-butanediol (BDO) and 330 g (2.79 mol) of monomer c succinic acid (SA) were mixed to react, the prepared aliphatic-aromatic copolyester having a melt index of 60 g/10 min at 190° C. under a load of 2.16 kg, wherein the catalyst was 0.62 g of lanthanum stearate;

2) 500 g of the aliphatic-aromatic copolyester prepared in the step 1) and 2.5 g of benzoyl peroxide were subjected to extrusion reaction in the extruder at the temperature of 170° C., to prepare a copolyester, the prepared copolyester having a melt index of 5 g/10 min at 190° C. under a load of 2.16 kg;

3) 500 g of the copolyester prepared in the step 2) was mixed with 1 g of antioxidant 1010, 1 g of antioxidant 168, 2.25 g of slipping agent erucamide, 2.25 g of anti-blocking agent silica and 10 g of nucleating agent Dupont Surlyn8920 resin, and subjected to melt extrusion in the twin-screw extruder at the temperature of 170° C. and granulation, to obtain a film blowing material;

4) the film blowing material was blown on the film blowing machine, to obtain a film with a thickness of 10 μm.

Regarding the conditions and devices in the above steps 1)-4), please refer to the corresponding steps in Example 1.

The obtained film was subjected to performance tests, and the test results of optical property, thermal property, barrier property and aging property were shown in Table 1, and the mechanical properties were shown in Table 2.

COMPARATIVE EXAMPLE 5

A method for preparing the biodegradable film, the method comprising the steps of:

1) preparation of a branched aliphatic-aromatic copolyester: under the action of a catalyst, 423.8 g (2.55 mol) of monomer a terephthalic acid (PTA), 650 g (7.21 mol) of monomer b 1,4-butanediol (BDO), 330 g (2.79 mol) of monomer c succinic acid (SA) and 1 g (0.01 mol) of monomer d glycerol were mixed to react, the prepared branched aliphatic-aromatic copolyester having a melt index of 20 g/10 min at 190° C. under a load of 2.16 kg, wherein the catalyst contained 0.245 g of tetrabutyl titanate, 0.1 g of dibutyltin oxide and 0.14 g of triphenylhydroxytin;

2) 500 g of the branched aliphatic-aromatic copolyester prepared in the step 1) and 2.5 g of benzoyl peroxide were subjected to extrusion reaction in the extruder at the temperature of 170° C., to prepare a copolyester;

3) 500 g of the copolyester prepared in the step 2) was mixed with 1 g of antioxidant 1010, 1 g of antioxidant 168, 2.25 g of slipping agent erucamide, 2.25 g of anti-blocking agent silica and 10 g of nucleating agent Dupont Surlyn8920 resin, and subjected to melt extrusion in the twin-screw extruder at the temperature of 170° C. and granulation, to obtain a film blowing material;

4) the film blowing material was blown on the film blowing machine, to obtain a film with a thickness of 10 μm.

Regarding the conditions and devices in the above steps 1)-4), please refer to the corresponding steps in Example 1.

The obtained film was subjected to performance tests, and the test results of optical property, thermal property, barrier property and aging property were shown in Table 1, and the mechanical properties were shown in Table 2.

TABLE 1

| | Density/ g·cm$^{-3}$ | Haze/% | Surface haze/% | Internal haze/% | Light transmittance/ % | Melting point/° C. | Glass transition temperature/ ° C. | Water permeability/ g·m$^{-2}$·d$^{-1}$, 38° C., 90% RH | Nominal strain retention rate after 208 hour xenon lamp irradiation (%) |
|---|---|---|---|---|---|---|---|---|---|
| Example 1 | 1.25 | 40 | 37 | 2.8 | 89 | 128 | −15.0 | 480 | 75 |
| Example 2 | 1.25 | 38 | 35 | 2.9 | 92 | 127 | −14.2 | 560 | 67 |
| Example 3 | 1.24 | 41 | 38 | 2.7 | 88 | 115 | −29.6 | 980 | 84 |
| Example 4 | 1.25 | 39 | 35 | 3.6 | 87 | 125 | −15.2 | 640 | 91 |
| Example 5 | 1.24 | 42 | 39 | 3.1 | 89 | 126 | −13.8 | 570 | 87 |
| Example 6 | 1.25 | 39 | 37 | 2.3 | 91 | 129 | −13.6 | 510 | 95 |

TABLE 1-continued

|  | Density/ g·cm$^{-3}$ | Haze/% | Surface haze/% | Internal haze/% | Light transmittance/ % | Melting point/°C. | Glass transition temperature/ °C. | Water permeability/ g·m$^{-2}$·d$^{-1}$, 38°C., 90% RH | Nominal strain retention rate after 208 hour xenon lamp irradiation (%) |
|---|---|---|---|---|---|---|---|---|---|
| Example 7 | 1.24 | 37 | 35 | 2.2 | 88 | 128 | −14.5 | 680 | 98 |
| Example 8 | 1.25 | 38 | 36 | 2.3 | 89 | 130 | −15.6 | 530 | 96 |
| Comparative Example 1 | 1.24 | 45 | 40 | 5.4 | 80 | 128 | −15.2 | 780 | 63 |
| Comparative Example 2 | 1.25 | 51 | 45 | 5.8 | 82 | 125 | −14.6 | 890 | 62 |
| Comparative Example 3 | 1.25 | 48 | 44 | 4.9 | 88 | 127 | −14.5 | 850 | 58 |
| Comparative Example 4 | 1.24 | 47 | 43 | 4.5 | 85 | 129 | −14.6 | 800 | 65 |
| Comparative Example 5 | 1.25 | 46 | 42 | 5.2 | 83 | 126 | −14.6 | 980 | 54 |

TABLE 2

|  |  | Example 1 | Example 2 | Example 3 | Example 4 | Example 5 | Example 6 | Example 7 | Example 8 | Comparative Example 1 | Comparative Example 2 | Comparative Example 3 | Comparative Example 4 | Comparative Example 5 |
|---|---|---|---|---|---|---|---|---|---|---|---|---|---|---|
| Dart impact/g (ASTM method A) | | 22 | 23 | 21 | 22 | 25 | 24 | 20 | 19 | 18 | 17 | 16 | 19 | 16 |
| Yield point/% | MD | 21.4 | 22.3 | 19.8 | 22.5 | 24.8 | 21.3 | 20.1 | 19.5 | 15 | 12 | 13 | 18 | 12 |
|  | TD | 17.9 | 19.2 | 16.3 | 20.1 | 22.3 | 16.9 | 16.8 | 16.5 | 11 | 9 | 10 | 15 | 10 |
| Tensile load/N (10 mm) | MD | 3.1 | 3.5 | 2.9 | 3.3 | 3.8 | 3.2 | 3.0 | 3.1 | 2.3 | 1.8 | 2.8 | 3.0 | 1.5 |
|  | TD | 2.8 | 3.2 | 2.7 | 3.1 | 3.5 | 2.9 | 2.7 | 2.8 | 1.9 | 1.5 | 2.3 | 2.8 | 1.3 |
| Tensile strength at yield/MPa | MD | 14 | 15 | 13 | 14 | 18 | 13 | 13 | 12 | 8 | 7 | 8 | 9 | 6 |
|  | TD | 10 | 12 | 11 | 11 | 15 | 10 | 10 | 10 | 5 | 5 | 6 | 8 | 4 |
| Tensile strength at break/MPa | MD | 24 | 26 | 21 | 25 | 30 | 22 | 23 | 21 | 15 | 13 | 12 | 16 | 10 |
|  | TD | 22 | 24 | 19 | 23 | 25 | 19 | 21 | 20 | 13 | 10 | 10 | 14 | 8 |
| Elongation at break/% | MD | 240 | 300 | 350 | 250 | 320 | 190 | 200 | 190 | 150 | 100 | 120 | 160 | 110 |
|  | TD | 420 | 450 | 480 | 380 | 480 | 300 | 290 | 250 | 180 | 120 | 140 | 170 | 100 |
| Right angle tear load/N | MD | 1.1 | 13 | 1.2 | 1.5 | 1.5 | 1.0 | 1.2 | 1.1 | 0.8 | 0.6 | 0.7 | 0.9 | 0.8 |
|  | TD | 1.7 | 2.0 | 1.8 | 2.1 | 1.9 | 1.5 | 1.5 | 1.3 | 0.9 | 0.8 | 0.8 | 1.0 | 0.6 |

It can be seen from the data in Table 1 and Table 2 that, compared with Comparative Example 1 which does not include the chain extension and tackifying step and Comparative Example 2 which includes the aliphatic-aromatic copolyester prepared using only three monomers, the films prepared in Examples 1-7 of the invention all have optical properties better than those of Comparative Examples 1 and 2, thermal properties basically equivalent to those of Comparative Examples 1 and 2, barrier properties and aging properties basically better than those of Comparative Examples 1 and 2, and overall mechanical properties better than those of Comparative Examples 1 and 2. Moreover, compared with Comparative Example 3 which includes the aliphatic-aromatic copolyester prepared using only the first catalyst and Comparative Example 4 which includes the aliphatic-aromatic copolyester prepared using only three monomers, the film prepared in Example 8 of the invention has optical property better than those of Comparative Examples 3 and 4, thermal property basically equivalent to those of Comparative Examples 3 and 4, barrier property and aging property better than those of Comparative Examples 3 and 4, and overall mechanical properties basically better than those of Comparative Examples 3 and 4. In addition, compared with Comparative Example 5 which includes the aliphatic-aromatic copolyester prepared using only the first catalyst and the third catalyst, the films prepared in Examples 1-8 of the invention have optical properties better than that of Comparative Example 5, thermal properties basically equivalent to that of Comparative Example 5, and barrier properties, aging properties and overall mechanical properties better than those of Comparative Example 5.

The examples of the invention have been described above, the above description is exemplary, not exhaustive, and the invention is not limited to the examples. Without departing from the scope and spirit of the examples, many modifications and changes are obvious to those of ordinary skill in the art.

The invention claimed is:

1. A biodegradable film, which is prepared from a composition comprising: a copolyester obtained by extrusion reaction of a branched aliphatic-aromatic copolyester derived from monomer a, monomer b, monomer c and monomer d with an organic peroxide, wherein:
   the monomer a is an aromatic dibasic acid or an ester derivative thereof;
   the monomer b is one or more of $C_2$-$C_{10}$ aliphatic dihydric alcohols or $C_3$-$C_{10}$ alicyclic dihydric alcohols;
   the monomer c is a $C_4$-$C_{20}$ aliphatic dibasic acid or an ester derivative thereof;

the monomer d is one or more selected from the group consisting of polyols with a functionality of more than 2, polycarboxylic acids with a functionality of more than 2, anhydrides with a functionality of more than 2, epoxy compounds or anhydrides with hydroxyl or carboxyl group, glycidyl ester, glycidyl ether, glycidol, lactones, and cyclic carbonates with hydroxyl or carboxyl side group;

the branched aliphatic-aromatic copolyester is obtained by reacting the monomer a, the monomer b, the monomer c and the monomer d in the presence of a catalyst system containing a second catalyst, wherein the second catalyst is a compound of $RE(R^3)_3$, wherein RE is a rare earth metal element, $R^3$ is at least one selected from the group consisting of halogen, alkoxy group, aryloxy group, acetylacetone group, and $R^4COO-$ group, and $R^4$ is $C_1$-$C_{30}$ alkyl group.

2. The biodegradable film as claimed in claim 1, wherein, in the compound of $RE(R^3)_3$ as the second catalyst, RE is lanthanum, cerium, praseodymium, neodymium, terbium, ytterbium, dysprosium, samarium, or scandium; the halogen is chlorine or bromine, the alkoxy group is $C_3$-$C_6$ alkoxy group, the aryloxy group is aryloxy group comprising at least one benzene ring and/or naphthalene ring, and $R^4$ is $C_1$-$C_{20}$ alkyl group.

3. The biodegradable film as claimed in claim 1, wherein the catalyst system further comprises a first catalyst, a third catalyst, or both;

wherein the first catalyst is one or more selected from the group consisting of an oxide of M, $M(OR^1)_n$, and $M(OOCR^2)_m$, wherein M is titanium, antimony, or zinc, n and m are each independently the valence of M, $R^1$ is $C_1$-$C_{10}$ alkyl group, and $R^2$ is $C_1$-$C_{20}$ alkyl group; and the third catalyst is at least one organotin compound.

4. The biodegradable film as claimed in claim 3, wherein the molar ratio of the catalyst in its entirety to a sum of the monomers a and c is 1:1000-20000, and the molar ratio of the first catalyst to the second catalyst to the third catalyst is 0-20:0.1-10:0-1.

5. The biodegradable film as claimed in claim 1, wherein the molar ratio of a sum of the monomers a and c to the monomer b is 1:0.8-3, the molar ratio of the sum of the monomers a and c to the monomer d is 100-2000:1, the molar ratio of the monomer a to the monomer c is 0:100-95:5.

6. The biodegradable film as claimed in claim 1, wherein the monomer a is terephthalic acid or dimethyl terephthalate;

the monomer b is chosen from ethylene glycol, 1,3-propanediol, or 1,4-butanediol;

the monomer c is chosen from succinic acid, succinic anhydride, dimethyl succinate, adipic acid, or dimethyl adipate;

the monomer d is chosen from pyromellitic dianhydride, glycerol, pentaerythritol, glycidyl succinate, glycidyl adipate, glycidyl terephthalate, ethylene glycol glycidyl ether, 1,4-butanediol glycidyl ether, glycidic acid, glycidol, 3-hydroxyphthalic anhydride, 4-hydroxyphthalic anhydride, 3-hydroxymethylcaprolactone, a five-membered, or six-membered cyclic carbonate with an alkylhydroxy group or an alkylcarboxyl group.

7. The biodegradable film as claimed in claim 1, wherein the branched aliphatic-aromatic copolyester is prepared by esterification or transesterification of a mixture comprising the monomer a, the monomer b, the monomer c, and the monomer d in the presence of the catalyst system, or by esterification or transesterification the monomer a and the monomer b to produce a first product; esterification or transesterification of the monomer c and the monomer d to produce a second product; and mixing the first product and the second product for copolycondensation reaction.

8. The biodegradable film as claimed in claim 1, wherein the branched aliphatic-aromatic copolyester has a melt index of 2-100 g/10 min at 190° C. under a load of 2.16 kg.

9. The biodegradable film as claimed in claim 1, wherein the organic peroxide is chosen from dialkyl peroxides, diacyl peroxides, or peroxyesters.

10. The biodegradable film as claimed in claim 9, wherein the dialkyl peroxide is chosen from dicumyl peroxide, 2,5-dimethyl-2,5-di(tert-butylperoxy)hexane, or di(tert-butylperoxyisopropyl)benzene; and the diacyl peroxide is benzoyl peroxide or lauroyl peroxide.

11. The biodegradable film as claimed in claim 1, wherein the organic peroxide is in an amount of 0.01 to 5 wt % based on the amount of the branched aliphatic-aromatic copolyester.

12. The biodegradable film as claimed in claim 1, wherein the copolyester has a melt index of 0.1 to 10 g/10 min at 190° C. under a load of 2.16 kg.

13. The biodegradable film as claimed in claim 1, wherein the composition further comprises one or more additives selected from the group consisting of an antioxidant, a slipping agent, an anti-blocking agent, and a nucleating agent.

14. The biodegradable film as claimed in claim 13, wherein the amount of the antioxidant is 0.05-5 parts, the amount of the slipping agent is 0.05-5 parts, the amount of the anti-blocking agent is 0.05-5 parts, and the amount of the nucleating agent is 0.1-20 parts based on 100 parts by weight of the copolyester.

15. The biodegradable film as claimed in claim 13, wherein the antioxidant is a mixture of a hindered phenol antioxidant and a phosphite antioxidant in a mass ratio of 1:1.

16. The biodegradable film as claimed in claim 15, wherein the phosphite antioxidant is triphenyl phosphate or trimethyl phosphate.

17. The biodegradable film as claimed in claim 13, wherein the slipping agent is stearate or organic carboxylic acid amide;

the anti-blocking agent is silica or talc; and the nucleating agent is chosen from hyperbranched polyamides, low density polyethylene or ethylene-methacrylic acid ionomers.

18. A method for preparing the biodegradable film as claimed in claim 1, the method comprising the steps of:

1) preparing a copolyester by extrusion reaction of the branched aliphatic-aromatic copolyester derived from the monomer a, the monomer b, the monomer c, and the monomer d with an organic peroxide, 2) extruding and granulating the copolyester obtained in the step 1) to obtain a composition; and 3) blowing the composition to obtain the biodegradable film.

19. The method as claimed in claim 18, wherein, in the compound of $RE(R^3)_3$ as the second catalyst, RE is lanthanum, cerium, praseodymium, neodymium, terbium, ytterbium, dysprosium, samarium, or scandium; the halogen is chlorine or bromine, the alkoxy group is $C_3$-$C_6$ alkoxy group, the aryloxy group is aryloxy group comprising at least one benzene ring and/or naphthalene ring, and $R^4$ is $C_1$-$C_{20}$ alkyl group.

20. The method as claimed in claim 18, wherein the catalyst system further comprises a first catalyst, a third catalyst, or both; wherein the first catalyst is one or more selected from the group consisting of an oxide of M, $M(OR^1)_n$, and $M(OOCR^2)_m$, wherein M is titanium, antimony, or zinc, n and m are each independently the valence of M, $R^1$ is $C_1$-$C_{10}$ alkyl group, and $R^2$ is $C_1$-$C_{20}$ alkyl group; and the third catalyst is at least one organotin compound.

21. The method as claimed in claim 18, wherein the monomer a is terephthalic acid or dimethyl terephthalate;
the monomer b is 1,3-propanediol or 1,4-butanediol;
the monomer c is chosen from succinic acid, succinic anhydride, dimethyl succinate, adipic acid, or dimethyl adipate;
the monomer d is selected from pyromellitic dianhydride, glycerol, pentaerythritol, glycidyl succinate, glycidyl adipate, glycidyl terephthalate, ethylene glycol glycidyl ether, 1,4-butanediol glycidyl ether, glycidic acid, glycidol, 3-hydroxyphthalic anhydride, 4-hydroxyphthalic anhydride, 3-hydroxymethylcaprolactone, and a five-membered or six-membered cyclic carbonate with an alkylhydroxy group or an alkylcarboxyl group.

22. The method as claimed in claim 18, further comprising preparing the branched aliphatic-aromatic copolyester by esterification or transesterification of a mixture comprising the monomer a, the monomer b, the monomer c, and the monomer d in the presence of the catalyst system, or
S1: by esterification or transesterification the monomer a and the monomer b to produce a first product;
S2: esterification or transesterification of the monomer c and the monomer d to produce a second product; and
S3: mixing the first product and the second product for copolycondensation reaction.

23. The method as claimed in claim 18, wherein the extrusion temperature in the step 1) is 130-190° C.

24. The method as claimed in claim 18, wherein the organic peroxide is chosen from dialkyl peroxides, diacyl peroxides or peroxyesters.

25. The method as claimed in claim 24, wherein the dialkyl peroxide is chosen from dicumyl peroxide, 2,5-dimethyl-2,5-di(tert-butylperoxy)hexane, or di(tert-butylperoxyisopropyl)benzene; the diacyl peroxide is benzoyl peroxide or lauroyl peroxide.

26. The method as claimed in claim 18, wherein the organic peroxide is used in an amount of 0.01 to 5 wt % based on the amount of the branched aliphatic-aromatic copolyester.

27. The method as claimed in claim 18, wherein the copolyester has a melt index of 0.1 to 10 g/10 min at 190° C. under a load of 2.16 kg.

28. The method as claimed in claim 18, wherein the copolyester is further mixed with additives in the step 2), and wherein the additives comprises an antioxidant, a slipping agent, an anti-blocking agent, and a nucleating agent.

29. The method as claimed in claim 28, wherein the amount of the antioxidant is 0.05-5 parts, the amount of the slipping agent is 0.05-5 parts, the amount of the anti-blocking agent is 0.05-5 parts, and the amount of the nucleating agent is 0.1-20 parts based on 100 parts by weight of the copolyester.

30. The method as claimed in claim 28, wherein the antioxidant is a mixture of a hindered phenol antioxidant and a phosphite antioxidant in a mass ratio of 1:1.

31. A copolyester, which is obtained by extrusion reaction of a branched aliphatic-aromatic copolyester derived from monomer a, monomer b, monomer c and monomer d with an organic peroxide, wherein
the monomer a is an aromatic dibasic acid or an ester derivative thereof;
the monomer b is one or more chosen from $C_2$-$C_{10}$ aliphatic dihydric alcohols or $C_3$-$C_{10}$ alicyclic dihydric alcohols;
the monomer c is a $C_4$-$C_{20}$ aliphatic dibasic acid or an ester derivative thereof;
the monomer d is one or more chosen from polyols with a functionality of more than 2, polycarboxylic acids with a functionality of more than 2, anhydrides with a functionality of more than 2, epoxy compounds or anhydrides with hydroxyl or carboxyl group, glycidyl ester, glycidyl ether, glycidol, lactones, or cyclic carbonates with hydroxyl or carboxyl side group; and
the branched aliphatic-aromatic copolyester is obtained by reacting the monomer a, the monomer b, the monomer c, and the monomer d in the presence of a catalyst system containing a second catalyst, wherein the second catalyst is a compound of $RE(R^3)_3$, wherein RE is a rare earth metal element, $R^3$ is at least one selected from the group consisting of halogen, alkoxy group, aryloxy group, acetylacetone group, and $R^4COO$— group, wherein $R^4$ is $C_1$-$C_{30}$ alkyl group.

32. The copolyester as claimed in claim 31, wherein, in the compound of $RE(R^3)_3$ as the second catalyst, RE is lanthanum, cerium, praseodymium, neodymium, terbium, ytterbium, dysprosium, samarium, or scandium; the halogen is chlorine or bromine, the alkoxy group is $C_3$-$C_6$ alkoxy group, the aryloxy group is aryloxy group comprising at least one benzene ring and/or naphthalene ring, and $R^4$ is $C_1$-$C_{20}$ alkyl group.

33. The copolyester as claimed in claim 31, wherein the catalyst system further comprises a first catalyst, a third catalyst, or both; wherein the first catalyst is one or more selected from the group consisting of an oxide of M, $M(OR^1)_n$, and $M(OOCR^2)_m$, wherein M is titanium, antimony, or zinc, n and m are each independently the valence of M, $R^1$ is $C_1$-$C_{10}$ alkyl group, and $R^2$ is $C_1$-$C_{20}$ alkyl group; and the third catalyst is at least one organotin compound.

34. The copolyester as claimed in claim 33, wherein the molar ratio of the catalyst in its entirety to the monomer (a+c) is 1:1000-20000, and the molar ratio of the first catalyst to the second catalyst to the third catalyst is 0-20: 0.1-10:0-1.

35. The copolyester as claimed in claim 31, wherein the amounts of various monomers are as follows: the molar ratio of (a+c) to b is 1:0.8-3, the molar ratio of (a+c) to d is 100-2000:1, the molar ratio of a to c is 0:100-95:5.

36. The copolyester as claimed in claim 31, wherein the monomer a is selected from terephthalic acid or dimethyl terephthalate; the monomer b is selected from ethylene glycol, 1,3-propanediol or 1,4-butanediol; the monomer c is selected from succinic acid, succinic anhydride, dimethyl succinate, adipic acid or dimethyl adipate; the monomer d is selected from pyromellitic dianhydride, glycerol, pentaerythritol, glycidyl succinate, glycidyl adipate, glycidyl terephthalate, ethylene glycol glycidyl ether, 1,4-butanediol glycidyl ether, glycidic acid, glycidol, 3-hydroxyphthalic anhydride, 4-hydroxyphthalic anhydride, 3-hydroxymethyl-caprolactone, a five-membered or six-membered cyclic carbonate with an alkylhydroxy group or an alkylcarboxyl group.

37. The copolyester as claimed in claim 31, wherein the branched aliphatic-aromatic copolyester is prepared as follows: under the action of a catalyst system, monomer a, monomer b, monomer c and monomer d are mixed for esterification or transesterification reaction, or the esterification or transesterification product of monomer a and monomer b and the esterification or transesterification product of monomer c and monomer d are mixed for copolycondensation reaction.

38. The copolyester as claimed in claim 31, wherein the branched aliphatic-aromatic copolyester has a melt index of 2-100 g/10 min at 190° C. under a load of 2.16 kg.

39. The copolyester as claimed in claim 31, wherein the organic peroxide is selected from dialkyl peroxides, diacyl peroxides or peroxyesters.

40. The copolyester as claimed in claim 39, wherein the dialkyl peroxide is selected from dicumyl peroxide, 2,5-dimethyl-2,5-di(tert-butylperoxy)hexane or di(tert-butylperoxyisopropyl)benzene; the diacyl peroxide is selected from benzoyl peroxide or lauroyl peroxide.

41. The copolyester as claimed in claim 31, wherein the organic peroxide is used in an amount of 0.01 to 5 wt % based on the amount of the branched aliphatic-aromatic copolyester.

42. The copolyester as claimed in claim 31, wherein the copolyester has a melt index of 0.1 to 10 g/10 min at 190° C. under a load of 2.16 kg.

43. The biodegradable film as claimed in claim 4, wherein the molar ratio of the first catalyst to the second catalyst to the third catalyst is 0.1-20:0.1-10:1.

44. The biodegradable film as claimed in claim 5, wherein the molar ratio of the monomer a to the monomer c is 0:100-60:40.

45. The biodegradable film as claimed in claim 5, wherein the molar ratio of the monomer a to the monomer c is 35:45-60:40.

46. The biodegradable film as claimed in claim 1, wherein the branched aliphatic-aromatic copolyester has a melt index of 5-100 g/10 min at 190° C. under a load of 2.16 kg.

47. The biodegradable film as claimed in claim 17, wherein the stearate is calcium stearate, and/or the organic carboxylic acid amide is erucamide or oleamide.

* * * * *